United States Patent Office 2,885,452
Patented May 5, 1959

2,885,452

DE-ARYLATION OF POLYARYLALKANES

Louis Schmerling, Riverside, Ill., assignor, by mesne assignments, to Universal Oil Products Company, Des Plaines, Ill., a corporation of Delaware No Drawing. Application May 26, 1955
Serial No. 511,400

17 Claims. (Cl. 260—668)

This invention relates to a process for dearylating polyarylalkanes and more particularly to a process for partially de-arylating polyarylalkanes in which at least one of the aryl groups is attached to a primary carbon atom and at least one aryl group is attached to a non-primary carbon atom.

An object of this invention is to partially dearylate polyarylalkanes.

A further object of the invention is to prepare monoarylalkanes by partially de-arylating polyarylalkanes in the presence of a Friedel-Crafts type catalyst.

One embodiment of the invention resides in a process for the partial de-arylation of a polyarylalkane by treating said alkane with a saturated hydrocarbon in the presence of a Friedel-Crafts type catalyst and recovering the resultant de-arylated alkanes.

A further embodiment of the invention is found in a process for the partial de-arylation of a polyarylalkane in which at least one aryl substituent is on a primary carbon atom and at least one aryl substituent is on a non-primary carbon atom by treating said alkane with a saturated hydrocarbon containing a tertiary carbon atom in the presence of a Friedel-Crafts type catalyst and recovering the resultant de-arylated alkane.

A specific embodiment of the invention resides in a process for the partial de-arylation of a polyarylalkane in which at least one aryl substituent is attached to a primary carbon atom and at least one aryl substituent is attached to a non-primary carbon atom by treating said alkane with a paraffin in the presence of a Friedel-Crafts type catalyst and recovering the resultant de-arylated alkane.

A more specific embodiment of the invention resides in a process of the partial de-arylation of 1,2-diphenyl-2-methylpropane by treating said propane with methylcyclohexane in the presence of aluminum chloride and recovering the resultant isobutylbenzene and (methylcyclohexyl)benzene.

Other objects and embodiments referring to alternative polyarylalkanes and saturated hydrocarbons containing a tertiary carbon atom will be referred to in the following further detailed description of the invention.

It has now been discovered that diarylalkanes in which at least one of the aryl groups is attached to a primary carbon atom and at least one aryl group is attached to a non-primary carbon atom may be partially de-arylated to form mono-arylated alkanes. The yield of mono-arylated alkanes will be greatly increased by the addition of a solvent, comprising a saturated hydrocarbon containing a tertiary carbon atom, to the reaction mixture. The monoarylalkanes formed by the process of this invention may be used as intermediates in the preparation of pharmaceuticals, resins, detergents, insecticides, etc. For example, isopentylbenzene may be nitrated to yield 2,4-dinitroisopentylbenzene which may be reduced to 2,4-diaminoisopentylbenzene (4-isobutyl-m-phenylenediamine) which is useful for inhibiting oxidation of hydrocarbons and other substances. The diamine may be converted by well-known processes to isopentylresorcinol which is not only an antioxidant but also an effective germicide. Likewise dodecylbenzene which may be formed by the partial dearylation of 1,2-diphenyldodecane may be sulfonated with sulfuric acid and the product used as a wetting agent.

Suitable polyarylalkanes in which at least one aryl substituent is on a primary carbon atom and at least one aryl substituent is on a non-primary carbon atom include those in which the aryl group is phenyl, naphthyl, a substituted phenyl, or a substituted naphthyl. Polyarylalkanes which may be partially de-arylated include 1,2-diphenyl-2-methylpropane, 1,2-diphenylbutane, 1,2-diphenyl-2-methylbutane, 1,2-diphenyl-3-methylbutane, 1,3-diphenyl-3-methylbutane, 1,2,3-triphenylbutane, 1,2,3-triphenyl-2-methylpropane, 1,2-diphenylpentane, 1,3-diphenyl-3-methylpentane, 1,2-diphenyl-4-methylpentane, 1,3-diphenyl-3-ethylpentane, 1,2-diphenyl-4-ethylpentane, 1,2-dinaphthylpropane, 1,2-dinaphthyl-2-methylpropane, 1,2-dinaphthylbutane, 1,2-dinaphthyl-2-methylbutane, 1,2-dinaphthyl-3-methylbutane, 1,2,3-trinaphthylbutane, 1,2,3-trinaphthyl-3-ethylbutane, 1,2-dinaphthylpentane, 1,2-dinaphthyl-3-methylpentane, 1,2-dinaphthyl-4-methylpentane, 1,2-dinaphthyl-3-ethylpentane, 1,2-dinaphthyl-4-ethylpentane. As hereinbefore stated, substituted polyphenyl and polynaphthyl alkanes may be partially de-arylated, the preferred substituents being alkyl and halo radicals, although other substituents such as hydroxyl, amino, cyano, isocyano, thio, etc., radicals may also be present. Examples of these substituted phenyls and naphthyls include 1,2-di(o-tolyl)propane, 1,2-di(m-tolyl)propane, 1,2-di(p-tolyl)propane, 1,2-di(o-chlorophenyl)propane, 1,2-di(m-chlorophenyl)-2-methylpropane, 1,2-di(p-chlorophenyl)-2-methylpropane, 1,2-di(o-tolyl)butane, 1,2-di(m-tolyl)butane, 1,2-di-p-tolyl)butane, 1,3-di(o-chlorophenyl)-3-methylbutane, 1,3-di(m-chlorophenyl)-3-methylbutane, 1,3-bis(2,4-dichlorophenyl)-3-methylbutane, 1,2-di(o-tolyl)pentane, 1,2-di(m-tolyl)pentane, 1,2-di(p-tolyl)pentane, 1,2-di(o-chlorophenyl)pentane, 1,2-di(m-chlorophenyl)pentane, 1,2-di(p-chlorophenyl)pentane, 1,2-di(o-ethylphenyl)propane, 1,2-di(m-ethylphenyl)propane, 1,2-di(p-ethylphenyl)propane, etc., 1,2-di(4-chloro-α-naphthyl)propane, 1,2-di(3-chloro-α-naphthyl)-3-methylpropane, 1,3-di(4-chloro-α-naphthyl)-3-methylbutane, 1,2-di(5-chloro-α-naphthyl)pentane, 1,3-di(5-chloro-α-naphthyl)-3-methylpentane, 1,2-di(5-chloro-β-naphthyl)propane, 1,2-di(5-chloro-β-naphthyl)-2-methylpropane, 1,2-di(4-methyl-α-naphthyl)butane, 1,3-di(4-methyl-β-naphthyl)-3-methylbutane, 1,2-di(4-hydroxy-α-naphthyl)propane, 1,3-di(4-hydroxy-β-naphthyl)-3-methylbutane, etc.

It is to be understood that the above mentioned compounds are only representatives of the class of compounds which may be partially de-arylated in this invention, and that said invention is not necessarily limited thereto.

The saturated hydrocarbons, which act both as hydrogen donors and as solvents for the reaction, which may be used in the process of this invention include paraffins and cycloparaffins containing tertiary carbon atoms as well as compounds which may be isomerized to such tertiary carbon atom containing hydrocarbons under the reaction conditions. These hydrocarbons include isobutane, isopentane, isohexanes, etc.; cyclohexane, methylcyclopentane, ethylcyclopentane, propylcyclopentane, methylcyclohexane, ethylcyclohexane, propylcyclohexane, 1,2-dimethylcyclopentane, 1,2-diethylcyclopentane, 1,2-dimethylcyclohexane, 1,2-diethylcyclohexane, 1,4-diethylcyclohexane, decahydronaphthalene, etc. n-Alkanes such as n-butane and n-pentane may also be used under conditions favorable to their isomerization; isoalkanes are, however, preferred because their greater activity permits carrying out the reaction at lower temperatures.

The reaction conditions under which the process of the present invention proceeds will depend largely upon the reactants and the materials used. The reaction is usually catalyzed by the use of a Friedel-Crafts type catalyst, the preferred catalysts comprising aluminum chloride, aluminum bromide, zirconium chloride, and boron fluoride, etc. Other metallic halides of this class such as ferric chloride may be used, but not necessarily with equivalent results. Generally speaking, temperatures ranging from −20° to about +150° C. or more will be used in the reaction, the preferred range, especially when aluminum chloride is used to catalyze the reaction, being in the range of from about −20° to about +50° C. In addition, if so desired, a hydrogen halide such as hydrogen chloride, hydrogen bromide, or hydrogen fluoride, or organic halides such as isopropyl chloride which acts as a source of hydrogen chloride in the reaction, may be added as a promoter to speed up the reaction. In addition, if so desired, the reaction mixture may also contain an aromatic hydrocarbon selected from the group consisting of benzene and primary alkylbenzenes along with the saturated hydrocarbon, the polyarylated alkanes and the catalyst. For example, if benzene is present in the reaction mixture an alkylbenzene will result, the alkyl group of the compound corresponding to that of the saturated hydrocarbon.

The process of this invention may be effected in any suitable manner and may comprise either a batch or continuous type operation. When a batch type operation is used, a quantity of the starting materials, namely, the polyarylalkane and a hydrogen halide, or a source of hydrogen halide are added to a stirred mixture of the saturated hydrocarbon and the catalyst in a suitable reaction vessel. The vessel is then heated or cooled to the desired temperatures depending on the catalyst used in the process, and if necessary, subjected to superatmospheric pressures. After a predetermined residence time has elapsed, the reaction vessel is allowed to come to room temperature and the reaction products are separated from the unreacted starting materials by conventional means, for example, by washing, drying, and fractional distillation.

Another method of operation of the present process is of the continuous type. A particularly suitable type of operation comprises a fixed bed type in which the Friedel-Crafts type catalyst is disposed as a bed in the reaction zone, said zone being maintained at suitable operating conditions of temperature and pressure. The polyarylalkanes and saturated hydrocarbons are passed therethrough in a continuous stream in either an upward or downward flow. If so desired, the starting materials (the polyarylalkanes and the saturated hydrocarbons) may be continuously introduced to the reaction zone through separate means or can be admixed outside the vessel and the mixture introduced into a single stream. The other compounds which may be present in the reaction mixture, namely, the hydrogen halide and aromatic compound are also introduced into the reaction vessel through separate means. The de-arylation of the polyarylalkane will continue until a desired time has elapsed, after which time the reaction products will be continuously withdrawn from the reaction zone, the liquid products separated from the catalyst, and distilled to separate the partially de-arylated arylalkanes, monoarylalkanes, unreacted polyarylalkanes, and saturated hydrocarbons, the latter two being recycled for use as a portion of the starting materials while the monoarylalkanes will be withdrawn and purified by conventional means hereinbefore set forth. The reaction zone in which the reaction takes place may comprise an unlined vessel or coil, or it may contain a solid packing material such as fire brick, alumina, dehydrated bauxite, and the like.

Other continuous types of processes which may be used in this invention include a fluidized type of operation, the compact moving bed type of operation, and the slurry type process.

The following examples which are given to illustrate the process of this invention are not, however, intended to limit the generally broad scope of the present invention in strict accordance therewith.

*Example I*

20 g. of 1,2-diphenyl-2-methylpropane containing 1 g. of isopropyl chloride added as a convenient source of hydrogen chloride was added, during a period of 7 minutes, to a stirred mixture of 60 g. of methylcyclohexane and 2 g. of aluminum chloride maintained at a temperature of 4° C. The reaction was stirred for an additional hour at 4° C. after which 77 g. of the upper layer was separated from 7 g. of the lower catalyst layer, washed with water and dilute alkali, dried and subjected to fractional distillation under reduced pressure. A cut boiling at 30–31° C. (5 mm.) was separated, said cut corresponding to 37% of the theoretical yield of isobutylbenzene. 3 g. of (methylcyclohexyl)benzene corresponding to 17% of the theoretical yield was also separated.

*Example II*

A solution of 1,2-diphenyl-3-methylbutane and toluene is added during about 15 minutes to a stirred mixture of methyl-cyclopentane and aluminum chloride which is maintained at a temperature in the range of from about 0° to about 20° C. The reaction mixture is further stirred for an additional hour at the same temperature, after which the upper layer is decanted from the lower catalyst layer, washed with water and dilute alkali, dried and subjected to fractional distillation under reduced pressure. The reaction products comprising isopentylbenzene, (methylcyclopentyl)benzene and a mixture of isomers of (methylcyclopentyl)toluene are separated from unreacted starting materials.

*Example III*

A mixture of 100 g. 1,2-diphenylpropane, 100 g. isopentane, 1 g. isopropyl chloride, and 5 g. aluminum chloride in a glass liner is sealed into a rotating autoclave. The autoclave is placed under a superatmospheric pressure of nitrogen and heated to a temperature of approximately 80° C. for a period of about 2 hours. At the end of this time the autoclave is allowed to cool, the pressure is reduced to atmospheric, and the autoclave is opened. The upper layer is separated from the lower catalyst layer, washed with water and dilute alkali, dried and fractionally distilled under reduced pressure. The reaction products, namely, propylbenzene and the higher boiling products including (t-pentylbenzene and 2-phenyl-3-methylbutane) are separated and purified.

I claim as my invention:

1. A process for the partial de-arylation of a polyarylalkane in which at least one aryl substituent is attached to a primary carbon atom and at least one aryl substituent is attached to a non-primary carbon, which comprises treating said polyarylalkane with a saturated hydrocarbon containing a tertiary carbon atom in the presence of a Friedel-Crafts type catalyst, and recovering the resultant partially de-arylated product.

2. A process for the partial de-arylation of a polyarylalkane in which at least one aryl substituent is attached to a primary carbon atom and at least one aryl substituent is attached to a non-primary carbon atom, which comprises treating said polyarylalkane with a paraffin containing a tertiary carbon atom in the presence of a Friedel-Crafts type catalyst, and recovering the resultant partially de-arylated product.

3. A process for the partial de-arylation of a polyarylalkane in which at least one aryl substituent is attached to a primary carbon atom and at least one aryl substituent is attached to a non-primary carbon atom, which comprises treating said polyarylalkane with a cycloparaffin containing a tertiary carbon atom in the presence of a Friedel-Crafts type catalyst, and recovering the resultant partially de-arylated product.

4. A process for the partial de-arylation of a polyarylalkane in which at least one aryl substituent is attached to a primary carbon atom and at least one aryl substituent is attached to a non-primary carbon atom, which comprises treating said polyarylalkane with a saturated hydrocarbon containing a tertiary carbon atom in the presence of aluminum chloride, and recovering the resultant partially de-arylated product.

5. A process for the partial de-arylation of a polyarylalkane in which at least one aryl substituent is attached to a primary carbon atom and at least one aryl substituent is attached to a non-primary carbon atom, which comprises treating said polyarylalkane with a saturated hydrocarbon containing a tertiary carbon atom in the presence of aluminum bromide, and recovering the resultant partially de-arylated product.

6. A process for the partial de-arylation of a polyarylalkane in which at least one aryl substituent is attached to a primary carbon atom and at least one aryl substituent is attached to a non-primary carbon atom, which comprises treating said polyarylalkane with a saturated hydrocarbon containing a tertiary carbon atom in the presence of zirconium chloride, and recovering the resultant partially de-arylated product.

7. A process for the partial de-arylation of a polyarylalkane in which at least one aryl substituent is attached to a primary carbon atom and at least one aryl substituent is attached to a non-primary carbon atom, which comprises treating said polyarylalkane with a saturated hydrocarbon containing a tertiary carbon atom in the presence of boron fluoride, and recovering the resultant partially de-arylated product.

8. A process for the partial de-arylation of a polyarylalkane in which at least one aryl substituent is attached to a primary carbon atom and at least one aryl substituent is attached to a non-primary carbon, which comprises treating said polyarylalkane with a saturated hydrocarbon containing a tertiary carbon atom and with an aromatic hydrocarbon selected from the group consisting of benzene and primary alkylbenzenes in the presence of a Friedel-Crafts type catalyst, and recovering the resultant partially de-arylated product.

9. A process for the partial de-arylation of a polyarylalkane in which at least one aryl substituent is attached to a primary carbon atom and at least one aryl substituent is attached to a non-primary carbon, which comprises treating said polyarylalkane with isopentane in the presence of a Friedel-Crafts type catalyst, and recovering the resultant partially de-arylated product.

10. A process for the partial de-arylation of a polyarylalkane in which at least one aryl substituent is attached to a primary carbon atom and at least one aryl substituent is attached to a non-primary carbon, which comprises treating said polyarylalkane with methylcyclopentane in the presence of a Friedel-Crafts type catalyst, and recovering the resultant partially de-arylated product.

11. A process for the partial de-arylation of a polyarylalkane in which at least one aryl substituent is attached to a primary carbon atom and at least one aryl substituent is attached to a non-primary carbon, which comprises treating said polyarylalkane with methylcyclohexane in the presence of a Friedel-Crafts type catalyst, and recovering the resultant partially de-arylated product.

12. A process for the partial de-arylation of 1,2-diphenyl-2-methylpropane which comprises treating the last named compound with methylcyclohexane in the presence of aluminum chloride, and recovering the resultant isobutylbenzene and (methylcyclohexyl)benzene.

13. A process for the partial de-arylation of 1,3-diphenyl-3-methylbutane which comprises treating the last-named compound with isobutane in the presence of aluminum chloride, and recovering the resultant isopentylbenzene and tertiary butylbenzene.

14. A process for the partial de-arylation of 1,2-diphenyl-n-pentane which comprises treating the last-named compound with methylcyclohexane in the presence of aluminum chloride, and recovering the resultant n-pentylbenzene and (methylcyclohexyl)benzene.

15. A process for the partial de-arylation of 1,2-diphenyl-3-methylbutane which comprises treating the last-named compound with toluene and methylcyclopentane in the presence of aluminum chloride, and recovering the resultant isopentylbenzene and (methylcyclopentyl) toluenes.

16. A process for the partial de-arylation of 1,2-diphenylpropane which comprises treating the last-named compound with isopentane in the presence of aluminum chloride, and recovering the resultant propylbenzene, tertiary pentylbenzene and 2-phenyl-3-methylbutane.

17. A process for the partial de-arylation of 1,2-diphenyl-2-methylpropane which comprises treating the last-named compound with methylcyclohexane in the presence of aluminum chloride and isopropyl chloride at a temperature in the range of from about 0° to about 20° C., and recovering the resultant isobutylbenzene and (methylcyclohexyl)benzene.

References Cited in the file of this patent

UNITED STATES PATENTS

| | | |
|---|---|---|
| 2,626,966 | Kennedy et al. | Jan. 27, 1953 |
| 2,673,224 | Kennedy et al. | Mar. 23, 1954 |
| 2,681,373 | Schneider | June 15, 1954 |
| 2,759,029 | Schmerling | Aug. 14, 1956 |
| 2,759,030 | Schmerling | Aug. 14, 1956 |

OTHER REFERENCES

Thomas: "Anhydrous Aluminum Chloride in Organic Chemistry," Reinhold Publishing Corp., N. Y. (1941), page 873.

Somerville et al.: Journal of the American Chemical Society, volume 74, 1952 (pp. 3803–3807 relied on).